Nov. 8, 1955 E. A. GREEN 2,722,698
APPARATUS FOR MAKING LOCK NUTS
Filed Dec. 11, 1951 3 Sheets-Sheet 1
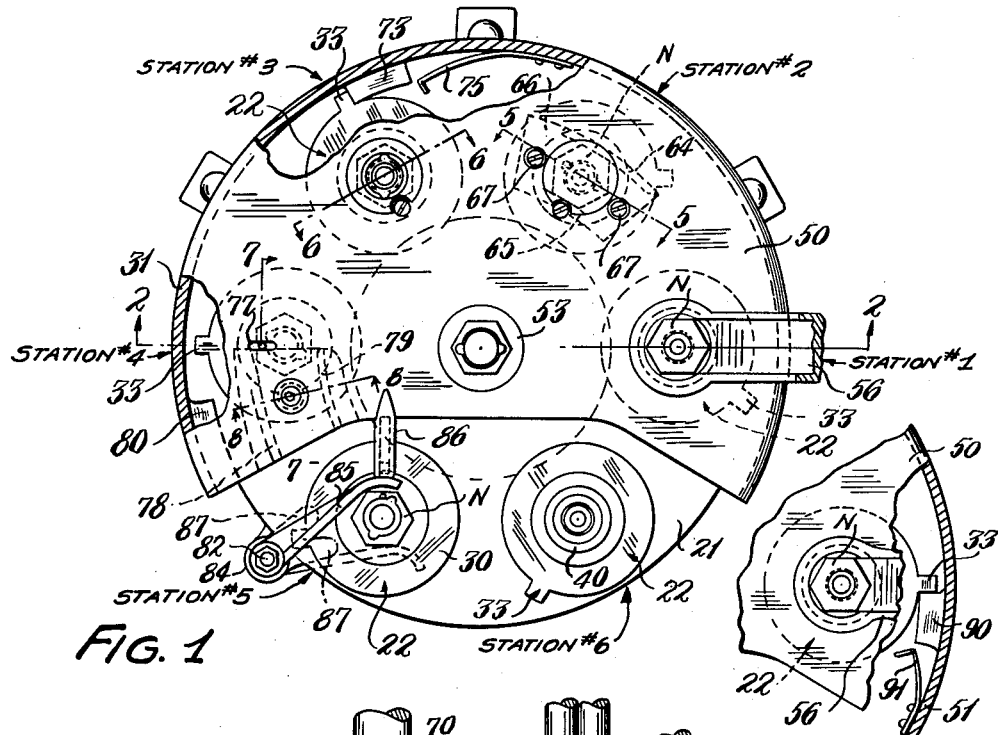
FIG. 1
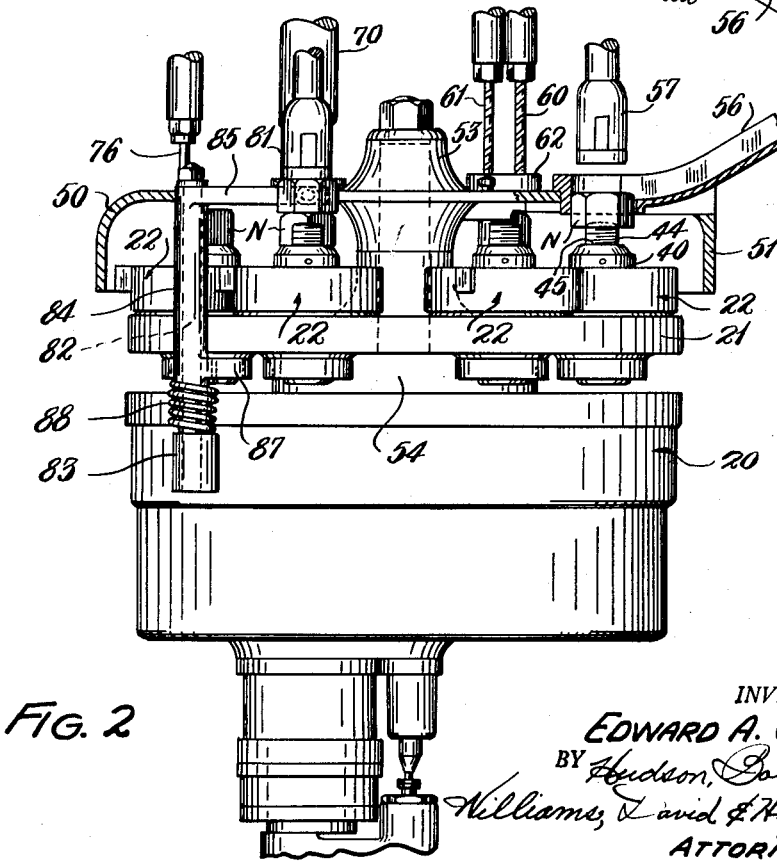
FIG. 2
FIG. 10
INVENTOR.
EDWARD A. GREEN
BY Hudson, Doughton,
Williams, David & Hoffmann
ATTORNEYS Nov. 8, 1955  E. A. GREEN  2,722,698
APPARATUS FOR MAKING LOCK NUTS
Filed Dec. 11, 1951  3 Sheets-Sheet 2

INVENTOR.
EDWARD A. GREEN
BY Hudson, Boughton,
Williams, David & Hoffmann.
ATTORNEYS Nov. 8, 1955 — E. A. GREEN — 2,722,698
APPARATUS FOR MAKING LOCK NUTS
Filed Dec. 11, 1951 — 3 Sheets-Sheet 3
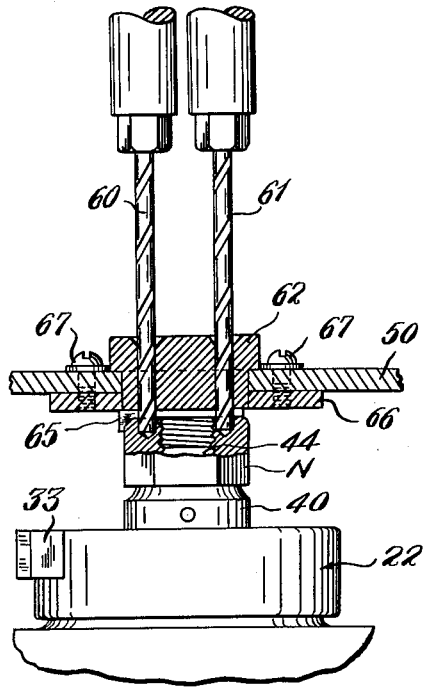
FIG. 5
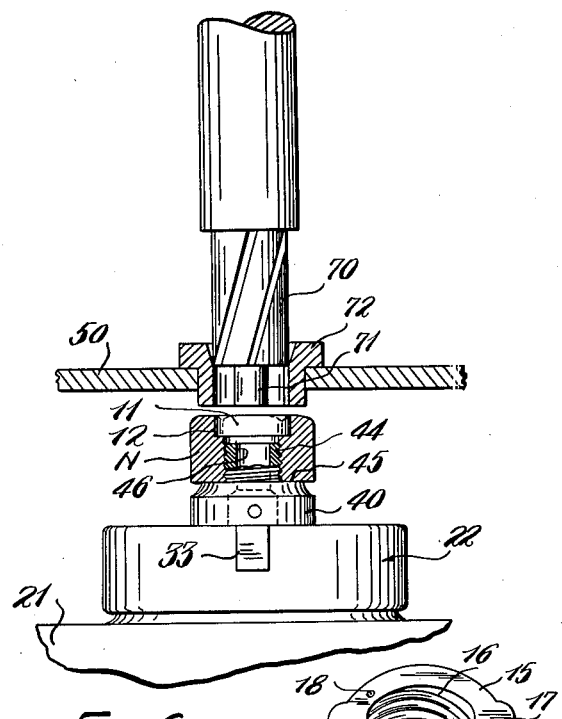
FIG. 6
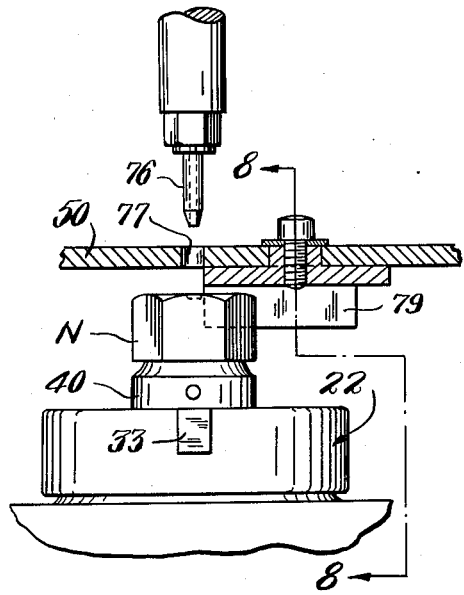
FIG. 7
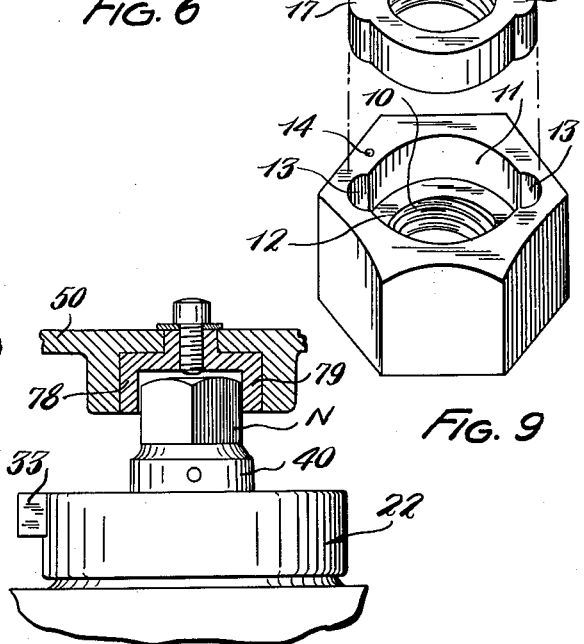
FIG. 8
FIG. 9
INVENTOR.
EDWARD A. GREEN
BY Hudson, Boughton,
Williams, David & Hoffmann.
ATTORNEYS

United States Patent Office 2,722,698
Patented Nov. 8, 1955

2,722,698

APPARATUS FOR MAKING LOCK NUTS

Edward A. Green, Chicago, Ill., assignor to Security Machine Products Company, Chicago, Ill., a corporation of Delaware Application December 11, 1951, Serial No. 260,989

16 Claims. (Cl. 10—72)

The present invention relates to new and useful improvements in the manufacture of screw threaded parts, and is particularly directed to new and improved apparatus for and process of internally machining a screw threaded part, such as a tapped nut, to close tolerances to provide a surface concentric with the axis of the screw thread of the nut and a second surface lying in a plane perpendicular to the axis of the nut and at a predetermined position therealong whereby the screw thread is caused to terminate at the last mentioned surface on a predetermined radius of the nut, within close tolerances.

The invention is particularly useful in manufacturing lock nuts of the type disclosed in my Patent Number 1,986,891, dated January 8, 1935. The patented nut preferably comprises a standard tapped nut having a counterbore in the crown face thereof in which a diametrically resilient retainer is positioned. The retainer is cylindrical and has internal threads similar to the threads of the nut and, after tapping, is slightly oval with the minimum thread pitch diameter slightly less than that of the nut threads, whereby the threads of the retainer grip the threads of the bolt to which the nut is attached and thereby prevent accidental loosening of the nut. It is important that the threads of the retainer have a limited separation relative to the threads of the nut, which is fully explained in the aforementioned patent and to maintain this thread relationship the retainer has a pair of lugs or ears which engage in complementally formed recesses in the sides of the counterbore in the nut. During the manufacture of the nuts and the retainers, reference marks indicating the termination of the nut threads at the bottom of the counterbore and the starting point of the retainer threads are placed on the faces of the nuts and the retainers, respectively, and in assembling the retainers in the nuts the retainers are placed in the counterbore so that the marks thereon are substantially adjacent to and radially aligned with the marks on the nuts. It will be understood that the reference marks are not necessarily radially aligned with the termination or starting points of the respective nut and retainer threads, but may have a predetermined angular offset relative thereto to provide the desired separation of the threads of the nut and retainer when the lock nut is assembled with the reference marks aligned as described. When the retainers and nuts are tapped by standard processes and the reference marks are applied on the faces thereof as described, the marks on the retainers will have random angular positions relative to the retainer lugs and the reference marks on the nuts will have random angular positions relative to the recesses therein for the reception of the retainer lugs, and it is therefore necessary to match the nuts and the retainers to be assembled therewith whereby the reference marks are substantially radially aligned, as described.

Alternatively, the nuts and retainers could be tapped by a "lead-thread"tapper, in which event the angular position of the starting point of the threads in the retainers could be controlled relative to the lugs of the retainers and by forming the lug recesses in the nut faces at a predetermined position relative to the termination point of the threads thereof, having regard for the thread separation between the respective nuts and retainers assembled therein as mentioned previously, any of the nuts and retainers so produced can be assembled without matching since each nut and retainer is substantially identical in all respects. If desired, only one lug need be formed in the retainer and one lug receiving recess need be formed on the nut.

An object of the present invention is to provide a new and improved apparatus for and process of machining tapped nuts to provide a counterbore concentric with the axis of the nut thread within close tolerances and an indentation or other mark on the nuts which has a predetermined accurate angular location relative to the termination of the threads of the nuts at the counterbored surface.

Another object of the invention is to provide a new and improved apparatus for the manufacture of nuts of the character described comprising an indexing turret having a plurality of rotatable members thereon to which nuts can be attached and which are moved by the turret from one station to another to position the nuts in alignment with machining tools which successively form one or more recesses therein, counterbore an opening into the side or sides of the recess or recesses, and which preferably mark the face of the nut at a predetermined position relative to the terminating or "zero" point of the nut thread at the bottom of the counterbore, and means for automatically positioning the nuts in proper angular alignment with the machining tools when the nuts are moved from one station to the other by the turret.

Still another object of the invention is the provision of a new and improved apparatus of the character referred to which automatically attaches tapped nuts to members on an indexing turret, which turret automatically moves the attached nuts successively into alignment with a plurality of machine tools, and having means for automatically removing the processed nuts from the turret after the last machining operation thereon.

Further objects and advantages of the invention will be apparent from the following description of preferred forms of the invention, reference being made to the accompanying drawings wherein:

Fig. 1 is a plan view of an indexing turret or apparatus embodying the invention for drilling, counterboring, and marking the zero position of the threads of tapped nuts, parts of the turret being shown broken away;

Fig. 2 is a sectional view taken substantially on line 2—2 of Fig. 1;

Fig. 5 is a sectional view taken substantially along the line 5—5 of Fig. 1 and on a larger scale;

Fig. 6 is a sectional view taken substantially along line 6—6 of Fig. 1 and on a larger scale;

Fig. 7 is a sectional view taken along line 7—7 of Fig. 1;

Fig. 8 is a sectional view taken along line 8—8 of Figs. 1 and 7;

Fig. 9 is a perspective exploded view of a lock nut machined during the manufacture thereof by the apparatus, and Fig. 10 is a fragmentary plan view similar to Fig. 1 showing a modification of the apparatus, certain parts thereof being broken away.

Figure 3:
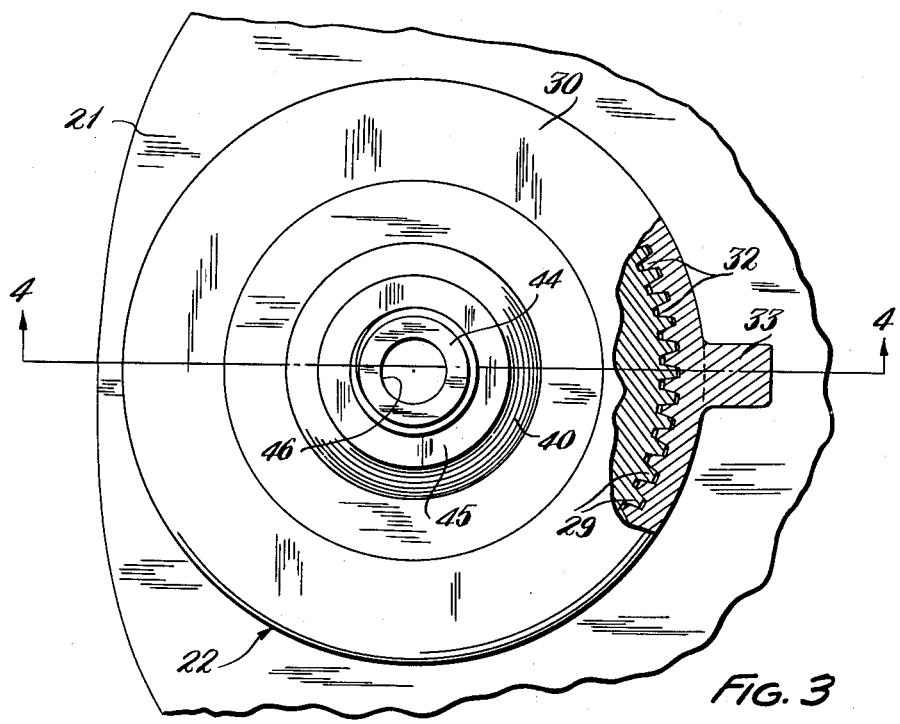
Fig. 3 is a view of a secondary turret taken substantially on line 3—3 of Fig. 4.

As mentioned previously, the present invention is particularly useful in the manufacture of lock nuts, one of which is illustrated in Fig. 9. The nut shown is of conventional hexagonal form tapped as at 10. The crown face of the nut has an annular counterbore 11 which is somewhat larger in diameter than the minimum diameter of the nut threads and the bottom surface 12 thereof lies in a plane perpendicular to the axis of the nut. Recesses 13 are formed in opposite side walls of the counterbore 11 and a slight indentation or score 14 is formed in the face of the nut at a predetermined position relative to the termination or "zero" point of the thread at the bottom surface 12 of the counterbore. A retainer 15 is adapted to be frictionally engaged in the counterbore 11 and comprises a cylindrical member having an internal thread 16 and radially projecting lugs or ears 17 which are adapted to engage in the recesses 13. The retainers are tapped without regard to the relationship of the starting or zero point of the threads relative to the lugs thereof. The retainer 15 is diametrally resilient and is slightly oval so that when it is positioned in the counterbore 11 it is compressed along its major axis so that it resiliently engages opposite walls of the counterbore. This construction is such that the minimum thread pitch diameter of the retainer is less than the thread pitch diameter of the nut and the maximum thread pitch diameter thereof is slightly greater than that of the nut whereby the threads of the retainer frictionally grip threads of a bolt to which the nut is attached and prevent accidental loosening of the nut. Preferably, the retainer has a small indentation 18 to indicate the zero position of the thread therein relative to the surface thereof which faces the bottom surface of the counterbore, and when the retainer is fixed in the counterbore, the mark 18 is aligned with the mark 14 so that the retainer thread has the limited separation relative to the nut thread referred to hereinbefore. It will be apparent that proper assembly of the lock nut depends upon accurate concentricity of the counterbore 11 and the threads of the nut and the accurate relative positioning of the mark 14 and the point of termination of the threads of the nut at the counterbore.

Figure 4:
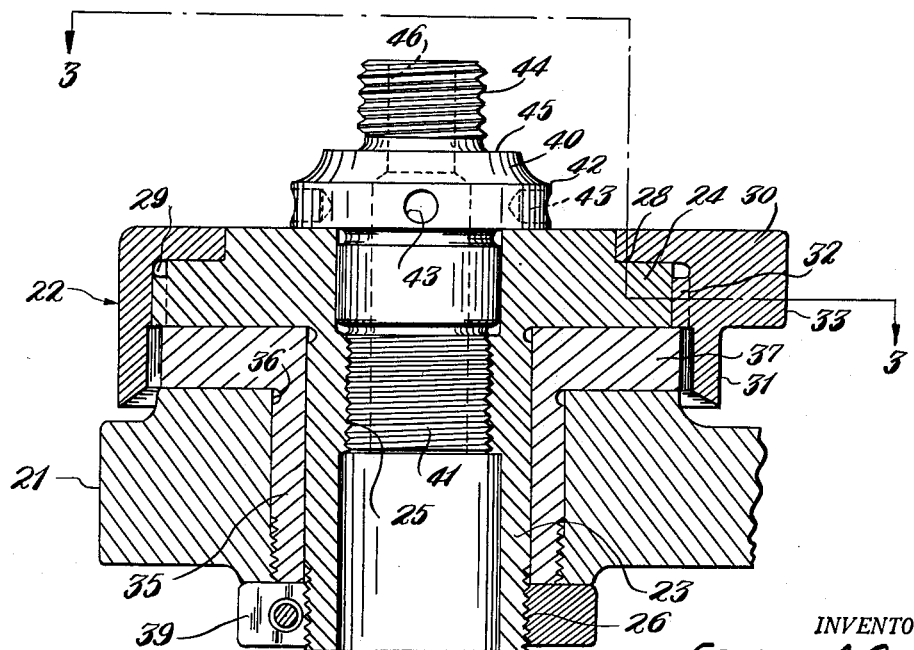
Fig. 4 is a sectional view taken substantially along line 4—4 of Fig. 3.

Referring now to Figs. 1 through 8, apparatus for machining right hand threaded nuts to provide the recesses, counterbore and marking described is shown in detail. It is to be understood that nuts having left-handed threads could be similarly machined by reversing the positions and direction of rotation of certain parts, which will be apparent to those skilled in the art. The apparatus shown comprises an indexing turret mechanism 20 of a fixed center multiple spindle drill press, not shown, and which may be of any suitable design which is commercially available. The turret mechanism includes a rotatable disk or indexing table 21 which is indexed in a counterclockwise direction as viewed in Fig. 1 by suitable mechanism, not shown, through sixty degrees for each indexing movement so that the table moves to six stations during each revolution thereof.

Six nut holding devices or secondary turrets 22 are rotatably journaled on the turret table 21 and are spaced from one another at sixty degrees apart about a circle concentric to the axis about which the table revolves. The devices 22 each comprises a bearing sleeve or spindle 23 having a flange 24 at one end, intermediate internal threads 25 and external threads 26 at the opposite end. The flange 24 has an annular undercut portion forming a shoulder 28, and gear teeth or splines 29 about the periphery thereof. An annular member 30 having a depending flange 31 therearound and internal gear teeth or splines 32, surrounds the spindle flange 24 and normally engages the shoulder 28 to position the splines thereof in mesh with the splines 29 of the spindle to prevent relative rotation of the spindle and member. The member 30 has a lug 33 projecting from the periphery thereof, and the lug may be positioned at practically any desired angular relationship with the spindle 23 by slipping the member upwardly, as viewed in Fig. 4, to disengage the splines 29 and 32, rotating the member relative to the spindle to the desired angle and then reengaging the splines by moving the member to the shoulder 28.

The spindle 23 is journaled in a bushing 35 which is threaded into a bore 36 in the turret table 21 and which has a flange 37 engaging the turret table and forming an annular bearing surface for the flange 24. The spindle 23 is secured in the bushing 35 by a nut 39 threaded on the lower end of the spindle or sleeve which projects beyond the bushing. As seen in the drawing, the flange 31 forms a shield to prevent chips and other foreign matter from entering between the bearing surfaces.

The spindle 23 receives an adaptor plug 40 which has a threaded part 41 and a flange or shoulder 42. The part 41 is threaded into the thread 25 of the spindle and firmly draws the shoulder 42 to the flange 24 so that the adaptor may be tightly secured to the spindle. Openings are preferably provided as at 43 to receive a spanner wrench by which the adaptor can be threaded into and out of the spindle. It will be apparent that the spindle 23, members 30 and 40 rotate as a unit when the gear teeth 29, 32 mesh, and the angular position of the lug 33 relative to the adaptor member 40 can be altered as desired by disengaging and reengaging the teeth 29, 32 as described.

The adaptors 40 each has an axially projecting hollow externally threaded stud 44 the axis of which is coincident with the axis on which the spindle 23, to which the adaptor is attached, rotates. The stud 44 projects at right angles from a surface 45 of shoulder 42 on the adaptor 40 and is adapted to have the nuts which are to be machined threaded thereon. In the event nuts having different threads are to be machined, the adaptors 40 can be replaced by similar adaptors having appropriate threaded studs 44. The interior of the stud 44 is preferably cylindrical and forms a guide 46 for a counterbore tool described hereinafter.

The radially extending lugs 33 of the secondary turrets 22 are adapted to engage abutments during rotation of the turret table 21 or rotation of the secondary turrets, and thereby either impart rotation to or position the latter relative to the turret table, as the case may be, and which is described more fully hereinafter.

A portion of the turret plate 21 is covered by an apron 50 which is in the form of a partial disk having a depending peripheral flange 51. Preferably the apron 50 has a hub portion 53 which is attached to a fixed hub formation 54 on the turret mechanism, as may be seen in Fig. 2.

Standard tapped nuts, indicated at N are preferably automatically positioned on the threaded studs 44 of the adaptors 40 by a slide 56 which extends from a suitable nut feeding mechanism, not shown, into registration with an opening in the apron 50 located so that the studs are positioned in alignment therewith when the turret table moves the devices 22 to a position herein designated as the #1 station. The tapped nuts may be fed onto the slide 56 either manually or automatically. Station #1 includes a rotating magnetic member 57 which is attached to one of the multiple spindles of the vertical drill press, and the magnet is rotated in a direction to thread the nuts onto the studs 44. It will be understood that the magnet 57 is lowered into operative position with the nuts each time the turret table 21 is stopped and is raised above the slide 56 while the turret plate is indexed. As mentioned previously, the vertical spindle drill press is not shown since such presses are well known.

The threads of the studs 44 preferably have a loose fit with the nut threads so that the resistance to threading the nuts thereon by the magnet 57 is less than the resistance to rotation of the spindles 23 whereby the nuts are threaded down to the top surface 45 of the shoulders 42, after which the magnet may rotate the nut and the secondary turret to which it is threaded. Although the fit between the threads of the nuts and studs 44 is loose, the nuts are concentric with the axis of the studs when the nuts engage the shoulders 42.

Station #2 includes a pair of drills 60, 61 which are carried by one of the multiple spindles of the drill press and which extend through guide openings in a block 62 attached in an opening through the top of the apron 50 and which drills are operative to bore the recesses 13 in the face of the nut. This drilling operation preferably occurs at the same time a nut is threaded on the succeeding turret 22 by the magnet 57, as was described previously. In order to form the recesses 13 on a major diameter of the nut, the nut is positioned for drilling by moving it between a pair of depending walls or guides 64, 65 which are spaced apart to closely receive opposite parallel sides of the nut as may be seen in Fig. 1 and the drills are positioned to engage the nut on a major diameter thereof. Preferably, the guides 64 and 65 are formed integral with a plate 66 which is attached to the underside of the top wall of the apron 50 by bolts 67, and the forward edges of the guides are tapered to facilitate entrance of the nut therebetween, as shown.

When the turret plate 21 is again indexed to move the nut from station #2 to station #3, the nut is brought into alignment with a counterbore tool 70 which is attached to one of the multiple spindles of the drill press and which has a cylindrical pilot 71 which enters the cylindrical formation 46 of the stud 44 on which the nut is threaded and guides the tool so that the counterbore 11 will be concentric with the axis of the nut threads within close tolerances. Preferably, the tool 70 extends through a bushing 72 supported in an opening through the top wall of the apron 50 and the bushing serves to cooperate with the tool to bring chips cut from the nuts to the top of the apron 50. The tool is rotated in a direction which tends to rotate the secondary turret 22, supporting the nut, clockwise, as viewed in Fig. 1, and the lug 33 of the turret is moved against an abutment 73 formed on the inside of the flange 51 of the apron which prevents rotation of the turret so that the nut is tightly threaded onto stud 44 against the shoulder surface 45. By this arrangement the depth of the counterbore can be accurately controlled since the elevation of the nut is predetermined by the shoulder surface 45. It will be noted that the angular position of the termination point of the threads of the studs 44 adjacent to the shoulder surfaces 45, and consequently the termination point of the threads of the nuts threaded on the studs relative to the stop lugs 33, can be predetermined by presetting the members 30 relative to the respective spindles 23, as described previously. This insures that the termination or zero points of the nut threads at the surfaces 12 of the counterbores occur at a predetermined angular position relative to a radial line of the nuts extending through the lugs 33 of the turrets on which the nuts are supported.

Inasmuch as the lugs 33 of the secondary turrets 22 approaching station #3 may accidentally be in a position to jam against the forward corner of the abutment 73, a flat spring 75 is attached to the apron flange and has a hooked portion which projects inwardly and in the path of lugs, which might otherwise jam on the abutment, and thereby rotates the respective turrets to deflect the lugs.

The secondary turrets 22 moving from station #3 to station #4 by indexing of the turret plate 21 remain stationary relative to the turret plate and bring the nut carried thereon into registration with a small hollow mill 76 which is carried by one of the multiple spindles of the drill press and which is adapted to be lowered through an opening 77 in the apron 50 and form a slight depression or mark 14 in the face of the nut. It will be appreciated that the radius through the mark 14 will be at a predetermined position with respect to the radius through the zero point of the nut thread at the bottom surface 12 of the counterbore, and this relationship may be at any angle desired, having consideration for the starting point of the threads of the retainers and the reference mark therefor, as explained previously.

It will be noted that although the reference mark 14 is made in the nuts at a predetermined angular position relative to the termination point of the threads at the counterbored surfaces 12, the positions of the reference marks relative to the lug recesses 13 will vary according to the chance positions of the nuts when they enter between the guides 64 and 65 at station #2. The magnet 57 which threads the nuts on the studs 44 preferably rotates slower than the drills 60 and 61 or the tool 70, but is operative to thread the nuts against the shoulders 45 and rotate the nuts and their turrets while the drills and tool are forming the lug recesses 13 and counterbores 11 in the preceding nuts, which causes the nuts to be presented between the guides 64 and 65 at random angular positions. Thus, out of a number of nuts so processed there will be a variety of angular positions between the lug recesses 13 and reference marks 14 which can be substantially matched with a number of retainers having random angular positions between the thread starting positions and the lugs 17 thereof, as mentioned previously.

After the mark 14 has been formed in the nuts at station #4 the turret plate 21 is again indexed and the nut is moved from station #4 and immediately enters between spaced guide walls 78, 79 which depend from the top wall of the apron 50 and which are similar to the guides 64 and 65 described hereinbefore. The guides 78 and 79 prevent rotation of the nut therebetween and at the same time the turret 22 on which the nut is threaded is carried by the turret plate 21 so that lug 33 thereof strikes a fixed abutment 80 projecting inwardly from the apron flange 51 thereby causing the turret 22 including the stud 44 thereof to rotate relative to the nut in a direction to loosen the nut on the stud. As the turret 22 moved to station #5 the nut is in a loosened condition on the stud 44 and a spindle driven magnet 81 similar to magnet 57 is lowered into operative engagement with the nut while rotating in a direction to remove the nut from the stud. The magnet 81 raises the nut from the stud as the press spindles are raised and, as the turret plate 21 is indexed from #5 to #6 position, mechanism is actuated to slide the finished nut from the magnet and into a suitable receptacle not shown.

The means for removing the nut from magnet 81 comprises a vertical shaft 82, rigidly fixed in a boss 83 integral with the stationary housing for the turret mechanism 20, and rotatably supporting a stem 84 journaled thereon. The upper end of the stem 84 has a laterally projecting hook shaped arm 85 which extends into alignment with the nut carried by the magnet 81 and which is adapted to sweep the nut from the magnet when the stem is rotated clockwise about its axis as viewed in Fig. 1. The arm 85 is normally held in engagement with a stop 86 attached to the apron 50 by a torsion spring 88 one end of which is attached to the stem 84 and the opposite end of which is attached to the housing of the boss 83. The stem 84 has a second laterally projecting arm 87 which projects inwardly beneath the turret table 21 and is arranged to be engaged by the nuts 39 which extend below the turret plate, as the nut holding secondary turrets 22 approaches the #5 station and is thereby moved to swing the arm 85 and sweep a nut from the magnet. The arm 87 is released as the turret table comes to rest and the arm 85 is snapped back against the stop 86 by the spring 88.

It will be understood that the magnets 57 and 81, the drills 60, 61, counterbore tool 70 and the mill 76 are all lowered into operative position and raised simultaneously so that various operations on the respective nuts attached to the spindles of the secondary turrets are preformed simultaneously and in this manner the production of the nuts is quite rapid and economical.

In the form of the invention shown six stations are provided and the #6 station merely consists of a nozzle for flushing cutting oil or other suitable liquid over the secondary turrets 22 to wash chips and other foreign matter therefrom just prior to the turrets moving beneath nut feed slide 56 at the #1 station. For sake of clarity the nozzle is not shown.

As mentioned hereinbefore, the retainers 15 could be tapped with a "lead-thread" tapping machine so that they all have the starting points of the threads thereof at a predetermined position relative to the lug or lugs thereon, for example, at a zero angle. Consequently, it is then necessary to form the retainer lug receiving recess or recesses, as the case may be, in the nuts at a predetermined position relative to the termination points of the threads at the bottoms of the counterbores 11 therein, having regard for the separation desired between the termination and zero points of the threads of the nuts and the retainers assembled therein, as mentioned previously. The nut machining apparatus described can be modified to produce nuts having the termination point of the threads within a tolerable angle relative to the lug receiving recess or recesses by positioning the secondary turrets 22 at station #1 so that the nuts on these turrets enter between the guides 64 and 65 with the zero point of the threads thereof at the shoulders 45 at a predetermined angular position relative to the lugs 33 of the turrets.

A preferred form of the modification of the apparatus mentioned is shown in Fig. 10 and it comprises an abutment 90 formed on the inside wall 51 of the apron 50 and arranged to be engaged by the lugs 33 of the secondary turrets 22 when the turrets are at the #1 station and are rotated by the magnet 57 rotating the nuts threaded on studs 44 down to the shoulders 45, thereby holding the turrets in a predetermined position for entrance between the guides 64 and 65. The magnet 57 acts as a slip clutch and rotates relative to the nuts when the turret lugs engage the abutment 90. Since the lugs 33 are apt to jam against the abutment 90 in the manner explained with reference to the abutment 73, a spring deflector 91 is attached to the apron and its form and operation is similar to the spring member 75, described hereinbefore.

When the nuts are moved to station #2, the guides 64, 65 position the nut for causing the lug recess or recesses to be formed on the major diameter of the nut closest to that determined by the positioning of the nut at station #1 and at most the nuts can be rotated only 30° by the guides, which angle is well within the tolerance of the angular thread separation between the nuts and their retainers, as is brought out in the aforementioned patent.

As mentioned, since the retainers to be assembled in the nuts are identical, only one lug 17 need be formed thereon, and only one corresponding recess 14 need be drilled in the nuts, hence, one of the drills 60, 61 would be eliminated. Likewise, since matching of retainers with lugs is unnecessary, the mill 76 can be eliminated from the apparatus.

It will be seen that by my invention I have provided a new and improved apparatus for and process of automatically drilling, counterboring, and marking nuts within close tolerances and with a minimum of cost and labor. Although I have described but one form of the invention it is to be understood that other forms, adaptations and modifications could be employed all falling within the spirit of the claims which follow.

Having thus described my invention, I claim:

1. In apparatus for manufacturing lock nuts or the like, a rotatable indexing turret, a nut holding member rotatably supported on said turret, said member having an externally threaded hollow stud to have screwed thereon a nut to be machined, said member being provided with a shoulder spaced from the free end of said stud a predetermined distance, and a counterboring tool adapted to align with said stud and the nut screwed thereon when said turret is indexed to a predetermined station to form a counterbore in said nut and having a pilot part projecting axially therefrom, said stud having a cylindrical opening concentric with the axis thereof and adapted to receive said pilot part of said tool, a fixed structural part and cooperating means on said part and said nut holding member engageable during the counterboring operation for preventing rotation of the nut holding member.

2. In apparatus for manufacturing lock nuts or the like, a rotatable indexing turret, a nut holding member rotatably supported on said turret, a cover structure over said turret, a pair of spaced walls extending from said cover and arranged to engage opposite sides of a nut held by said member when said member is indexed with said turret to a predetermined station to position said nut relative to said member, and means to machine said nut held between said spaced walls.

3. In apparatus for manufacturing lock nuts or the like, a rotatable indexing turret, a threaded nut holding member rotatably supported on said turret, guide means fixed relative to said turret and arranged to receive opposite sides of a nut threaded on said member during indexing of said member by said turret from one station to another to prevent rotation of said nut relative to said member, a radially projecting lug on said member, abutment means fixed relative to said turret and adjacent to said member and in alignment with said lug when said member is indexed from said one station to the other by said turret, whereby engagement of said lug with said abutment causes rotation of said member relative to the nut thereon to loosen the latter.

4. In apparatus for manufacturing lock nuts or the like, a rotatable indexing turret, a nut holding member carried by said turret and having an externally threaded nut receiving stud, magnetic means rotatable and linearly movable to remove a nut from said holding member, an arm swingable in a plane of the nut supported by said magnet after the nut has been removed from said stud and adapted to sweep the nut from said magnet, and cooperating means operatively associated with said arm and turret and engageable during the indexing of the turret to swing said arm in timed relation to the movement of said turret.

5. In apparatus for manufacturing lock nuts or the like, a rotatable indexing turret, a nut holding member carried by said turret and having an externally threaded nut receiving stud, magnetic means rotatable and linearly movable to remove a nut from said holding member, an arm swingable in a plane of the nut supported by said magnet after the nut has been removed from said stud and adapted to sweep the nut from said magnet, and means including a second arm engageable by a part on said turret and swung by said part to move the first mentioned arm in timed relation to the movement of said turret.

6. In apparatus for manufacturing lock nuts or the like, a rotatable indexing turret, nut holding member rotatably supported on said turret, a lug projecting radially of said member, a rotating tool engageable with the nut on said member when said member is indexed to a predetermined station, an abutment fixed relative to said turret and adjacent to said member and engageable by said lug thereon to limit rotation of said member by said tool, and resilient deflectable means engageable by said lug when said member is indexed toward said one station and operative to deflect said lug from wedging engagement with said abutment.

7. In apparatus for manufacturing lock nuts or the like, a rotatable indexing turret, a threaded nut holding member rotatably supported on said turret, said threaded member having a lug, slip clutch means to engage a nut in registration with said threaded member to screw the nut thereon, and an abutment fixed relative to said turret and adjacent to said member when said member is indexed to a predetermined station and engageable by said lug thereon to limit rotation of said member by said clutch means after the nut has been fully screwed thereon.

8. In apparatus for manufacturing lock nuts or the like, a rotatable indexing turret, a threaded nut holding member rotatably supported on said turret, said threaded member having a shoulder and a lug projecting radially from said member, rotating magnetic means to engage a nut in registration with said threaded member to screw the nut thereon and against said shoulder, and an abutment fixed relative to said turret and adjacent to said member when said member is indexed to a predetermined station and engageable by said lug thereon to limit rotation of said member by said magnetic means after the nut has engaged said shoulder.

9. A turret structure comprising a rotatable threaded member, means to detachably connect a tapped nut to said member to have a counterbore provided in the nut locating means engaging said rotatable member and extending laterally therefrom to engage the nut when screwed on said member, stop means carried by said member and adapted to engage a fixed abutment to limit rotation of the member, means for forming a counterbore in the nut to within a predetermined distance of said locating means and means to selectively position said stop means at any one of a plurality of angular positions relative to the zero position of the threads on said member whereby the termination point of the nut thread at the bottom of the counterbore that is formed thereon will be located substantially in the radial line that includes said stop means when said nut fully engages said locating means.

10. A turret structure comprising a rotatable spindle having teeth about the periphery thereof and concentric with the axis of said spindle, said spindle being provided with a threaded stud to have a tapped nut screwed thereon preparatory to forming a counterbore in the nut locating means engaging said spindle and extending laterally therefrom to form an abutment against which the nut will engage when screwed on said spindle, an annular member having internal teeth adapted to mesh with said teeth of said spindle whereby said annular member can be adjusted angularly to various positions with respect to the zero position of the threads of said threaded stud and said spindle means for forming a counterbore in the nut to within a predetermined distance of said locating means, and stop means integral with said annular member and adapted to engage a fixed abutment to limit rotation of said spindle and member whereby the termination point of the nut threads at the bottom of the counterbore that is formed therein will be located substantially in the same radial line as said stop means when the nut is completely screwed against said locating means.

11. A turret structure comprising a rotatable spindle having a peripheral flange provided with teeth concentric to the axis of said spindle, said spindle being provided with an externally threaded stud adapted to have a tapped nut screwed thereon preparatory to forming a counterbore in the nut, said spindle also having a flange spaced a predetermined distance from the free end of said stud and against which the nut can be screwed, means for forming a counterbore in the nut to within a predetermined distance of said flange spaced from the free end of said stud an annular member surrounding the peripheral flanged part of said spindle and capable of movement axially of the spindle, said annular member having internal teeth adapted to mesh with said teeth of said spindle whereby said member can be adjusted to various angular relationships with respect to the zero position of said threaded stud and said spindle, and a stop member projecting from said annular member and adapted to engage a fixed abutment to limit rotation of said spindle whereby said annular member and said stop member on being angularly positioned relative to said zero position of said threaded stud and said spindle to cause the termination point of the nut threads at the bottom of the counterbore that is formed therein to be located in substantially the same radial line in which said stop member is located when the tapped nut is completely screwed against said flange of the spindle spaced from the free end of said stud.

12. A turret structure comprising a rotatable member having a threaded part upon which a tapped nut can be screwed, means forming a shoulder surface extending laterally of said threaded part and providing an abutment against which the nut will engage when screwed on said part, means for forming a counterbore in the nut to within a predetermined distance of said shoulder surface a stop member connected with said rotatable member and adapted to engage stop means to limit rotation of said rotatable member, and means to adjust the position of said stop member angularly about the axis of rotation of said rotatable member with respect to the zero position of the threads for said threaded part of the rotatable member whereby when a counterbore is formed in the nut by a counterboring tool the termination of the nut threads at the bottom of the counterbore will be substantially in the radial line that includes said stop member when the tapped nut is screwed tightly against said shoulder surface and the stop member is angularly positioned with respect to said zero position of the threaded part for the rotatable member.

13. In apparatus for manufacturing lock nuts or the like, a rotatable indexing turret, a nut holding member rotatably supported on said turret and having a threaded stud thereon to receive a tapped nut to be machined, means forming a shoulder adjacent to said stud to limit the position of a nut threaded on said stud, a counterboring tool engageable with the nut on said stud and rotatable to thread the nut into engagement with said shoulder when the nut holding member is indexed to a predetermined station by said turret and to form a counterbore in said nut to within a predetermined distance of said limiting means, a fixed structural part and relative to which said turret indexes, and cooperating elements carried by said structural part and nut holding member, the element carried by said nut holding member being positionable angularly relative to the zero point of said threaded stud, said cooperating elements being engageable at said station to limit rotation of said nut holding member by said tool to a predetermined angular position relative to said turret, whereby the zero point of the nut thread at the bottom of the counterbore formed in the nut by the tool when the nut is threaded completely onto said stud has a predetermined angular position relative to a radial line of the nut extending through the element of said cooperating elements which is carried by the nut holding member.

14. In apparatus for manufacturing lock nuts or the like, a rotatable indexing turret, a nut holding member rotatably supported on said turret and having a threaded stud thereon to receive a tapped nut to be machined, means forming a shoulder adjacent to said stud to limit the position of a nut threaded on said stud, a counterboring tool engageable with the nut on said stud and rotatable in a direction to thread the nut into engagement with said shoulder when the nut holding member is indexed to a predetermined station by said turret and to form a counterbore in said nut to within a predetermined distance of said limiting means, a fixed structural part and relative to which said turret indexes, and means to limit rotation of said nut holding member by said counterboring tool to a predetermined angular position relative to said turret and including an element carried by said member and projecting radially therefrom and positionable with respect to the zero position of said threaded stud and an element carried by said part and in the path of said first mentioned element as said member rotates whereby the zero point of the nut thread at the bottom of the counterbore formed in the nut by the tool when the nut is threaded completely onto said stud has a predetermined angular position relative to a radial line of the nut extending through the element carried by said member.

15. Apparatus of the character defined in claim 13 characterized by the cooperating elements comprising a lug on the nut holding member and an abutment on said structural part and adjacent to the path of travel of the nut holding member when said member is indexed to said counterboring station and engageable by said lug to limit rotation of said nut holding member.

16. In apparatus for manufacturing lock nuts or the like, a rotatable indexing turret, a threaded nut holding member rotatably supported on said turret, guide means fixed relative to said turret and arranged to receive opposite sides of a nut threaded on said member during indexing of said member by said turret from one station to another to prevent rotation of said nut, a fixed structural part and relative to which said turret indexes, and cooperating means carried by said member and engageable with said part to rotate said member on said turret when said member is indexed from said one station to the other by said turret to cause relative movement between said member and nut to loosen the nut on the holder member.

References Cited in the file of this patent

UNITED STATES PATENTS

| | | |
|---|---|---|
| 518,803 | Bohm | Apr. 24, 1894 |
| 1,087,024 | Lingo | Feb. 10, 1914 |
| 1,762,192 | Pierce | June 10, 1930 |
| 2,038,933 | Hunt | Apr. 28, 1936 |
| 2,167,673 | Oberhoffken | Aug. 1, 1939 |
| 2,371,440 | Hall | Mar. 13, 1945 |
| 2,388,467 | Cole | Nov. 6, 1945 |
| 2,391,712 | King | Dec. 25, 1945 |
| 2,418,070 | Green | Mar. 25, 1947 |
| 2,464,411 | Neff | Mar. 15, 1949 |